United States Patent Office 2,895,996
Patented July 21, 1959

2,895,996
PURIFICATION OF NEOPENTYLGLYCOL BY STEAM SUBLIMATION

Howard Nolan Wright, Jr., and Hugh J. Hagemeyer, Jr., Longview, Tex., assignors to Eastman Kodak Company, Rochester, N.Y., a corporation of New Jersey No Drawing. Application July 16, 1956
Serial No. 597,878

5 Claims. (Cl. 260—637)

This invention relates to an improved process for purifying neopentylglycol. In a specific aspect this invention relates to an improved process for separating neopentylglycol from by-product salts and other reaction products formed in the process of preparing the neopentylglycol.

Neopentylglycol (2,2-dimethyl propane-1,3-diol or pentaglycol), a white crystalline solid (M.P. 130–131° C.) is formed by the condensation of isobutyraldehyde with formaldehyde and subsequent reduction of the intermediate product. Hydroxypivaldehyde is formed as an intermediate, and it is reduced either catallytically or with additional formaldehyde in the presence of sodium hydroxide to the desired diol. The hydroxypivaldehyde which is formed as an intermediate in the process is a highly reactive compound and it has a tendency to form an ester by a Tischenko reaction. When catalytic hydrogenation is employed to reduce the intermediate aldehyde to the desired diol, the crude neopentylglycol is contaminated with as much as 10 to 15% of the neopentylglycol ester of hydroxypivalic acid. This ester is not stable when the crude reaction mixture is distilled and for maximum recovery of neopentylglycol, the crude reaction product is saponified with caustic. Distillation in the presence of sodium salts of hydroxypivalic acid and other organic acids in the reaction mixture results in considerable decomposition of the neopentylglycol and a very impure product.

Various means have been suggested for the purification of crude neopentylglycol. For example, extraction with a solvent medium containing a low boiling point ketone, such as acetone, has been suggested as a purification procedure. The undesirability of such a process is quite obvious since the procedure would necessitate means for separating the solvent and for subsequent recovery of the solvent medium. Direct separation of the neopentylglycol from the crude reaction product by vacuum distillation results in a product having a melting point considerably lower than pure neopentylglycol indicating that the product is relatively impure, and with such a procedure yields of neopentylglycol in the neighborhood of 70% of theoretical have been obtained. Obviously, such procedures are uneconomical and the desirability and necessity of using improved procedures for recovery of neopentylglycol from the crude reaction product are quite obvious.

In accordance with this invention, it has been found that a substantially pure solution of neopentylglycol in water can be obtained by steam sublimation of the crude reaction product at reduced pressures. The water can subsequently be distilled away from the pure solution of neopentylglycol in water to leave a substantially pure neopentylglycol. Also, if the neopentylglycol is contaminated with by-product 2,2,4-trimethyl-1,3-pentanediol after distilling away the water, neopentylglycol can be separated from this impurity and recovered by simple distillation procedures.

In accordance with this invention, the purification of neopentylglycol by steam sublimation is carried out by subliming the neopentylglycol with steam away from the crude reaction mixture. The crude reaction mixture can be prepared by a procedure involving the reaction of isobutyraldehyde and formaldehyde at about 60° C. in the presence of potassium carbonate. The resulting hydroxypivaldehyde is then reduced with hydrogen in the presence of Raney nickel at 140–150° C. and 1000 p.s.i. Alternatively the hydroxy pivaldehyde can be reduced with excess formaldehyde. The crude reaction mixture containing the neopentylglycol, as obtained from the reaction autoclave, is saponified with caustic to remove any ester present. Then the crude neopentylglycol or aqueous solution thereof is fed to the sublimator with steam in a sufficient amount to sublime the neopentylglycol away from the reaction salts. In conducting the steam sublimation, the neopentylglycol is actually swept away from the reaction salts by sparging with steam. Thus, the overhead from the sublimator contains water and neopentylglycol. These components in the overhead may be present in a weight ratio of about 7 parts of water to 3 parts of neopentylglycol. In an actual operation, when the sublimator was at a pressure of 100 mm. and a temperature of 120 to 130° C., the overhead from the steam sublimator contained from 15 to 40% by weight of neopentylglycol in water.

Two important factors affect the composition of the sublimate. These factors are the reduced pressure and the temperature of the sublimator. Pressure varying from 2 to 500 mm. are used and the sublimator temperature is within the range of 60 to 150° C. At temperatures above 150° C., decomposition of the neopentylglycol takes place as a result of the prsence of the reaction salts. At temperatures below 60° C., the percent of neopentylglycol in the overhead from the sublimator is so low as to make the process uneconomical. The preferred temperature range is 70 to 130° C. and the preferred pressure is within the range of 25 to 250 mm.

The aqueous solution of neopentylglycol that is obtained from the sublimator is subsequently dried in a suitable distillation column and the molten neopentylglycol can be fed directly to a flaker. If desired, it is also practical to feed the aqueous solution of neopentylglycol to a spray drier or any other suitable drying means. If the neopentylglycol is contaminated with by-product 2,2,4-trimethyl-1,3-pentanediol, a second distillation column is required for removal of the impurity and in that event the neopentylglycol is distilled overhead from the trimethyl pentanediol.

The following examples are illustrative of this invention:

Example 1

Crude neopentylglycol was prepared by reaction of isobutyraldehyde and formaldehyde followed by reduction of the hydroxypivaldehyde with hydrogen over Raney nickel at superatmospheric pressure. The autoclave discharge containing 52% neopentylglycol and 4% ester (equiv. wt. 204) was filtered to remove Raney nickel and saponified to remove the ester. After drying the mixture of neopentylglycol and sodium salts of organic acids was fed to a sublimator to separate the nepentylglycol from the ester. The sublimator was operated at 10–20 mm. and 120–135° C. Considerable decomposition took place and the recovery of neopentylglycol was only 46% of the theoretical. The neopentylglycol obtained in this fashion had a melting point of 110–117° C. and contained approximately 1.5% ester which was formed during the sublimation.

Another portion of the same discharge which had been filtered and saponified to remove ester was fed to a steam sublimator operating at 25 mm. and 80–90° C. and the steam sublimator overhead contained 16% neopentylglycol in water. The sodium salts were sludged continuously from the base of the sublimator. The steam sublimate was dried and the neopentylglycol from the base overflowed to a flaker. The recovery of pure neopentylglycol, melting point 127–131° C., was 98%.

Example 2

Neopentylglycol was prepared by the aldol condensation of formaldehyde with excess iso-butyraldehyde at 60–65° C. in the presence of potassium carbonate catalyst. Material from the aldol reactor was neutralized to a pH of 5–6 with acetic acid, then fed to a distillation column where unreacted iso-butyraldehyde was stripped from the aldol products. Feed to the hydrogenation autoclave contained 36% hydroxypivaldehyde, 9% isobutyraldol and 5% ester (equiv. wt. 204). The autoclave discharge contained 36% neopentylglycol, 9% 2,2,4-trimethyl-1,3-pentanediol (TMP) and 5% ester. This product was filtered and saponified to remove ester. An attempt to distill the neopentylglycol away from the TMP and the salts gave only a 62% recovery of neopentylglycol which contained approximately 7.5% TMP. This material had a melting point of 112–116° C. and was not satisfactory as a polyester intermediate. A second portion of this autoclave discharge was filtered, saponified and fed to a steam sublimation apparatus with an equal volume of steam. The steam sublimator was operated at 40–50 mm. and 90–100° C. The steam sublimate overhead contained approximately 28% glycol dissolved in water. The steam sublimate was dried by distillation and the dry molten glycols were fed to a 30-plate column and the neopentylglycol distilled overhead at 206° C. and the trimethylpentanediol was taken off from the base. A 94% recovery of neopentylglycol was realized and this material had a melting point of 129–131° C. The assay as neopentylglycol was 100%. A 95% recovery of 2,2,4-trimethyl-1,3-pentanediol was realized and this material had a melting point of 50–51° C.

Example 3

Neopentylglycol prepared as in Example 1 was filtered, saponified and fed into a steam sublimation apparatus with an equal volume of steam. The steam sublimator was operated at 95–100 mm. pressure and 130–135° C. The steam sublimator overhead contained 24% glycol, less than 0.06% material which azeotropes with water and less than 0.006% salts calculated as sodium hydroxypivalate. The base material was mobile and very little splattering was encountered.

The steam sublimate was dried by distillation and the dry molten glycols were fed to a 30-plate column where the neopentylglycol distilled overhead at 206–207° C. at atmospheric pressure. A 93% recovery of neopentylglycol was realized and this material had a melting point of 129–130° C.

Example 4

Neopentylglycol was prepared as in Example 1, filtered, saponified and fed into a steam sublimation apparatus with an equal volume of steam. The steam sublimator was operated at 175–185 mm. pressure and 135–140° C. Overhead from the stream sublimator contained 7–8% neopentylglycol, less than 0.06% material which azeotropes with water and 0.031% salts calculated as sodium hydroxypivalate. The base material was very mobile and very little splattering was encountered.

The steam sublimate was treated as in Example 3 to produce neopentylglycol with a melting point of 129–130° C.

We claim:

1. In the process for producing neopentylglycol of high purity wherein isobutyraldehyde is reacted with formaldehyde and resulting hydroxypivaldehyde is reduced to neopentylglycol, the improvement which comprises saponifying neopentylglycol-hydroxypivalate esters in the neopentylglycol-containing reaction mixture with caustic and passing steam through the saponified reaction mixture at a sub-atmospheric pressure and a temperature of 60–150° C. to produce an aqueous solution of neopentylglycol.

2. In the process for producing substantially pure neopentylglycol wherein isobutyraldehyde is reacted with formaldehyde and resulting hydroxypivaldehyde is reduced to neopentylglycol, the improvement which comprises saponifying neopentylglycol-hydroxypivalate esters in the neopentylglycol-containing reaction mixture with caustic and sparging the saponified reaction mixture with steam at a pressure of 2–500 mm. and a temperature of 60–150° C. to produce an aqueous solution of neopentylglycol.

3. In the process for producing substantially pure neopentylglycol wherein isobutyraldehyde is reacted with formaldehyde and resulting hydroxypivaldehyde is reduced with hydrogen to neopentylglycol, the improvement which comprises saponifying neopentylglycol-hydroxypivaldehyde esters in the neopentylglycol-containing reaction mixture with caustic, sparging the saponified reaction mixture with steam at a pressure of 2–500 mm. and a temperature of 60–150° C. to produce an aqueous solution of highly purified neopentylglycol, and drying resulting aqueous solution to produce substantially pure solid neopentyl glycol.

4. A process according to claim 2 wherein the pressure is within the range of 25 to 250 mm.

5. A process according to claim 2 wherein the temperature is within the range of 70 to 130° C.

References Cited in the file of this patent

UNITED STATES PATENTS

| Number | Name | Date |
|---|---|---|
| 1,929,381 | Jaeger et al. | Oct. 3, 1933 |
| 2,135,063 | Walker et al. | Nov. 1, 1938 |
| 2,358,697 | Filbert | Sept. 19, 1944 |
| 2,400,724 | Walker | May 21, 1946 |
| 2,702,816 | Klein et al. | Feb. 22, 1955 |

OTHER REFERENCES

Lucas et al.: "Principles and Practice in Organic Chemistry," Wiley, New York, N.Y., 1949, pp. 122–6.

Tipson: "Technique of Organic Chemistry," vol. IV, Interscience, New York, N.Y., 1951, pp. 603–14, 627–8, 639–44.